D. P. CLARK.
LOCOMOTIVE TOY.
APPLICATION FILED JULY 2, 1908.
919,540.
Patented Apr. 27, 1909.
2 SHEETS—SHEET 2.
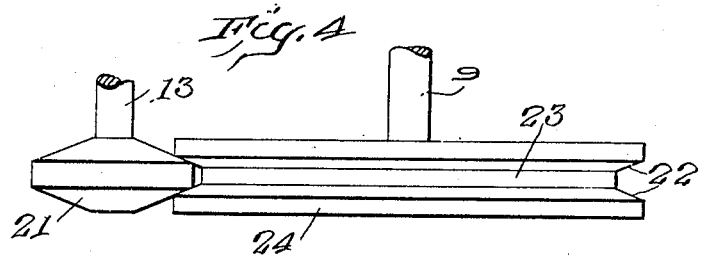
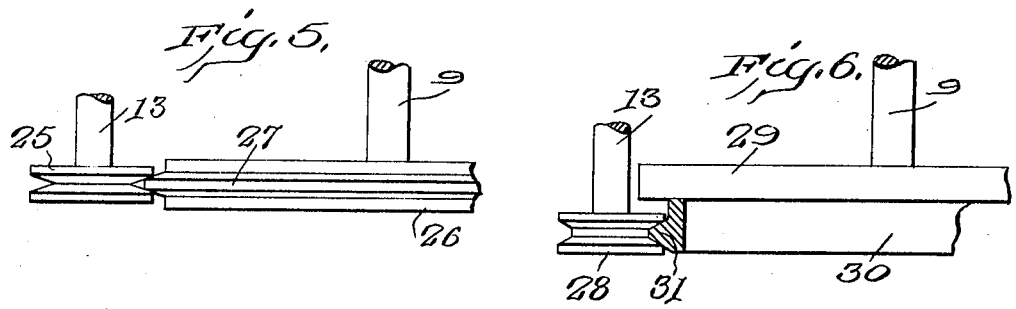
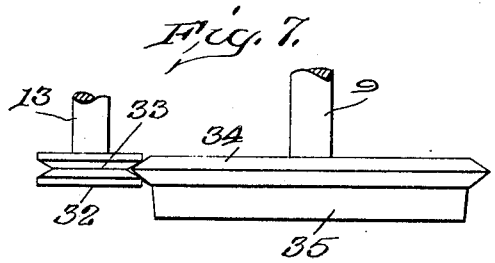
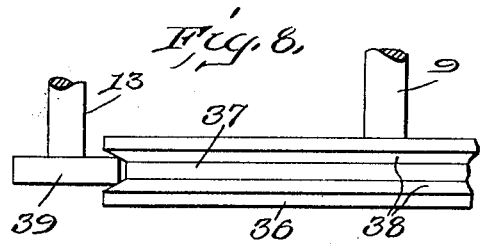
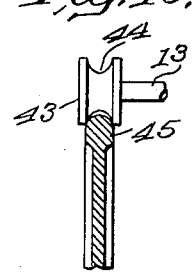
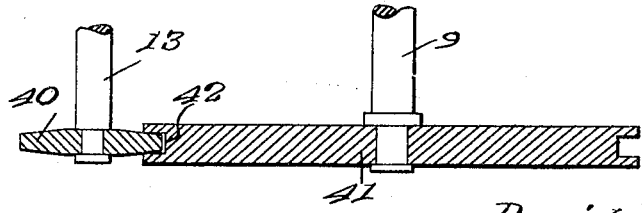
Witnesses
G. Howard Walmsley,
F. W. Schaefer.
Inventor
David P. Clark,
By H. A. Toulmin,
Attorney

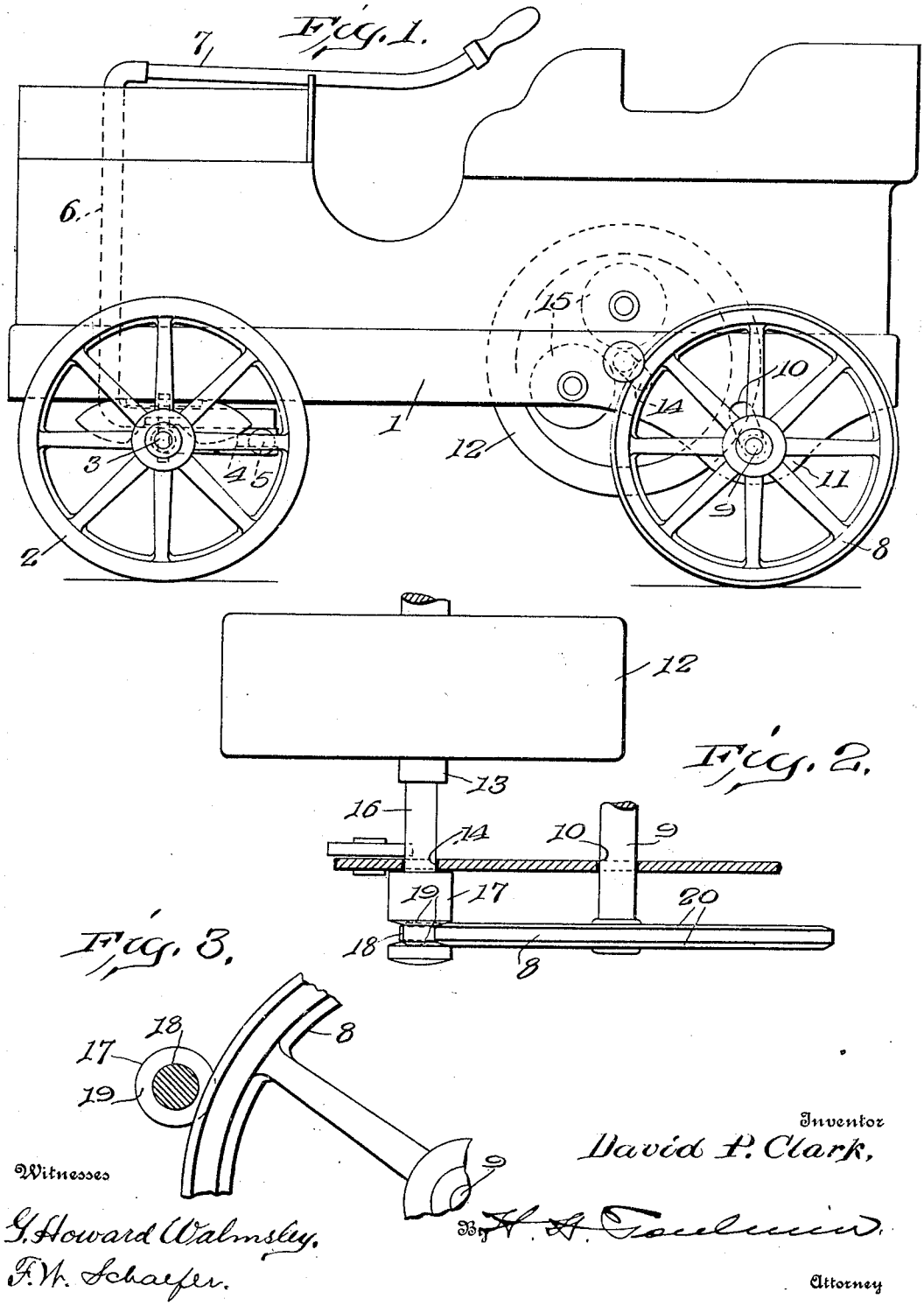

UNITED STATES PATENT OFFICE.

DAVID P. CLARK, OF DAYTON, OHIO.

LOCOMOTIVE TOY.

No. 919,540.  Specification of Letters Patent.  Patented April 27, 1909.

Application filed July 2, 1908. Serial No. 441,526.

*To all whom it may concern:*

Be it known that I, DAVID P. CLARK, a citizen of the United States, residing at Dayton, in the county of Montgomery and State of Ohio, have invented certain new and useful Improvements in Locomotive Toys, of which the following is a specification, reference being had therein to the accompanying drawings.

This invention relates to locomotive toys, and more particularly to that class of locomotive toys in which the power to drive them is stored in and derived from an inertia wheel. Heretofore, in this art it has been well known to employ two essential types of devices for transmitting motion from the inertia wheel shaft to the ground wheels of these toys. These types are illustrated in patents heretofore granted to myself, and have been the subject of extensive manufacture and sale by me. In one of these types, the practice has been to employ four ground or driven wheels and to apply the inertia wheel shaft in contact with the peripheries of all four of such wheels. This was done to obtain sufficient frictional contact to properly transmit the motion of the inertia wheel to the ground or driven wheels. In the other type, the practice has been to gear the shaft of the inertia wheel to one of the ground wheels, the driven wheel, by means of a pinion and spur gear.

The object of the present invention is to make it feasible and practicable to obtain sufficient frictional contact to transmit the motion of the inertia wheel shaft efficiently to properly and attractively drive the toy, and yet to use but one or two of the ground wheels as driven wheels.

The essential feature of the invention consists in a plurality of contact surfaces on the driving member and a plurality of contact surfaces on the driven member, so that the contact surfaces for transmitting the motion may be sufficient, even though but one or two of the ground wheels are utilized as driven wheels, and in a provision for giving a wedging effect to the opposing contact surfaces so that they can the more readily, by the weight of some part of the device, be forced and held in closer contact to increase the efficiency of transmission. And further, the invention consists in certain novel features and in certain combinations and arrangements of parts to be hereinafter described, and then more particularly pointed out in the claims.

In the accompanying drawings, Figure 1 is a side elevation of a locomotive toy embodying my invention; Fig. 2 is a detail plan view of the driving member and the driven member; Fig. 3 is an enlarged detail view of the driving and driven members; and Figs. 4 to 10 are detail views of several modified forms of the invention.

In Figs. 1 to 3 of the drawings I have illustrated the preferred form of my invention and have shown the same as comprising a body portion 1, preferably formed of sheet metal and in imitation of the body of a typical automobile touring car. This body portion is supported at its forward end by steering wheels 2 which may be mounted thereon in any suitable manner. In the present instance, they are shown as mounted upon a pivoted axle 3 having rearwardly extending arms 4, to the outer ends of which is connected a transverse bar 5, which, in turn, is secured to a steering rod 6 having a handle 7, by means of which the steering wheels are to be adjusted to cause the toy to travel either in a straight line or in a circle. The rear portion of the body is supported upon suitable ground wheels 8, which, in the present instance, are the driving wheels. These wheels are mounted upon an axle 9, which is movably mounted on the body portion of the vehicle in such a manner that the rear portion of the body may have a downward, and the axle a forward movement. This is accomplished, preferably, by forming downwardly and rearwardly extending slots 10 in the side walls of the body and mounting the axle 9 in these slots in such a manner that it may have a rotary and a sliding movement therein. In the present instance, these slots are formed in downwardly extending portions 11 carried by the side walls of the body of the vehicle. The inertia wheel 12 is mounted on a shaft 13 which is journaled in the side walls of the body of the toy, and, in the present instance, is journaled in downwardly and rearwardly extending slots 14 and is provided with suitable antifriction rollers, which are here shown as disks 15 rotatably mounted on the side walls of the vehicle near the upper ends of the slots 14 and arranged in such relation to said slots as to be engaged by the shaft 13 and to form the upper limit of the movement of that shaft. In order to still further reduce the frictional contact between the shafts and its bearings, that portion of the shaft which extends through the slot 14 is reduced, as shown at 16, to as small a diameter as is consistent with strength and durability.

Referring now to the essential features of the invention, the shaft 13 carrying the inertia wheel is provided with a suitable driving member which may be either a part of the shaft itself or a part secured thereto, and a suitable coöperating driven member is mounted on the axle 9 to receive the power from the driving member and thus propel the toy. In the construction shown in Figs. 1 to 3, the driving member carried by the shaft 13 comprises an enlarged portion 17 on that shaft, this enlarged portion being preferably arranged beyond the outer side walls of the toy and forming a friction pinion which is provided with a plurality of contact surfaces, which contact surfaces are adapted to coöperate with a corresponding plurality of contact surfaces carried by the driven member on the axle 9, this driven member being, in this form of the device, the ground wheel 8. These contact surfaces may be provided in any suitable manner, but, in the present form of the device, they are provided by forming an annular groove 18 in the friction pinion 17 carried by the shaft 13, which groove has its side walls converging inwardly, as shown at 19, that is, inclined toward the center of the shaft 13. The driven member or ground wheel 8 has the opposite edges of its rim beveled or tapered, as shown at 20, to correspond to the inclined walls of the groove 18. The width of that portion of the driven member or wheel 8 which enters the groove 18 in the driving member is slightly greater than the base of the groove. Consequently, the periphery of the driven member 8 will be supported out of contact with the bottom of the groove 18 and the entire weight of the rear portion of the toy will be supported upon the inclined contact surfaces of the two members, this weight resting directly upon the ground wheels or the driving wheels 8 and not upon the axle 9, inasmuch as this axle is mounted in the slot 10 in such a manner that the driving member on the shaft 13 which is mounted in the side walls of the toy, will rest upon the ground wheel before the axle 9 reaches the upper limit of its movement in the slot. Consequently, the driving member will engage the driven member with a wedging action, which action is such as to greatly increase the frictional contact between the two members and to give an improved result in the transmission mechanism.

While I have shown the preferred form of my invention as having the driving member formed integral with the shaft 13 and provided with an annular groove having converging side walls, and the driven member as comprising the driving wheel 8 having the opposite edges of its rim beveled to engage the converging side walls of the groove, it will be readily apparent that this arrangement of the device may be greatly varied without departing from the spirit of my invention, and I have, in Figs. 4 to 10 of these drawings, illustrated several different ways in which substantially the same results may be accomplished.

In Fig. 4 I have shown the driving member as consisting of a pinion 21 mounted on the shaft 13 and having its opposite sides inclined or tapered toward the outer edge and adapted to engage the converging side walls 22 of a groove 23 formed in the driven member 24 which is carried by the axle 9 and may be either the driving wheel or may be a part secured to the axle.

In Fig. 5 I have shown the driving member 25 of substantially the same construction as that shown in Figs. 1 to 3 and have shown the driven member 26 as provided on its outer periphery with a bead 27 having its opposite sides tapered to correspond to the converging side walls of the groove in the driving member 25.

In Fig. 6 the driving member 28 is also similar to the driving member shown in Figs. 1 to 3, but the driven member 29 is provided with an annular flange 30 having mounted thereon a bead 31 adapted to engage the groove in the driving member 28 and having its opposite edges shaped to conform to the shape of that groove.

In Fig. 7 I have shown the invention as applied to a flanged car wheel adapted to run on a track, and, in this form of the device, the driving member 32 is provided with a V-shaped groove 33 adapted to receive a flange 34 carried by the wheel 35, this flange being tapered to correspond to the V-shaped groove 33 in the driving member 32.

In Fig. 8 the driven member 36 is shown as provided with an annular groove 37 having inwardly converging side walls 38, while the driving member 39 is in the form of a disk having its walls substantially parallel throughout its diameter.

In Fig. 9 the construction in Fig. 8 is reversed and the driving member 40 has its opposite side walls tapered in the same manner as has the driving member in Fig. 4, but the driven member 41 is provided with an annular groove 42, the opposite side walls of which are parallel.

While I have, in the most of the forms here illustrated, shown the periphery of the one member out of contact with the bottom of the groove in the other member in order to secure a more efficient wedging action, it will be apparent that these members may be made to fit exactly one within the other in such a manner that not only the converging side walls, but the bottom of the groove in one member and the periphery of the other member will be in contact, thus providing three points of contact. Such an arrangement will operate effectually, but inasmuch as the converging side walls are subjected to a greater amount of friction than are the central portions of the members, these side walls will wear away more quickly than will the central portions, and, consequently, the friction between these tapered side walls will gradually decrease until eventually the central portions of the members will be the only portions in contact one with the other and the efficiency of the device will be greatly reduced. As illustrating this feature of the invention I have shown one form of the device, (see Fig. 6), with three contact surfaces as above described, but in all of the other forms here illustrated I have shown but two contact surfaces. Further, it will be apparent that either one or both ends of the shaft 13 may be provided with the driving member, but, in the manufacture of the toy, I find it advisable to provide the friction driving members on each end of the shaft 13, thus providing the toy with four distinct frictional contacts between its driving and driven members. This construction of the transmission devices wherein the driving and driven members are to be provided with a plurality of contact surfaces, is such as to increase the frictional contact between the driving and driven members of the toy to such an extent as to provide an exceedingly efficient transmission mechanism which will propel the toy at a high rate of speed. This efficiency is still further increased by so arranging the contact surfaces of the driving and driven members that they will engage one another with a wedging action, thereby giving an increased frictional contact between these surfaces. It will further be observed that the construction of the mechanism as a whole is such that it can be produced at cost, requiring, as it does, a minimum amount of material and a very small amount of labor to produce the same, and at the same time this construction is of a very strong, durable nature and the parts are so arranged relatively one to the other that the wear on the contact surfaces will be automatically compensated for by the movement of the driving and driven members toward and away from each other. It will also be observed that the arrangement of the several moving parts is such as offer a minimum amount of resistance to the operation thereof, all of these features combining to provide a locomotive toy which is very simple in its construction and inexpensive to manufacture, but which has a high degree of efficiency.

I wish it to be understood that I do not desire to be limited to the details of construction shown and described for obvious modifications will occur to a person skilled in the art. One of these is illustrated in Fig. 10 where I have shown the coöperating members, that is, the driving member and the driven member, with curved contact surfaces. As shown in this figure, the driving member 43 is provided with a groove 44 having curved walls, and the driven member has its rim rounded to correspond with the rounded groove 44. The degrees of curvature of the groove 44 and of the rim of the member 45 differ in such a manner that the rim of the member 45 will engage the side walls only of the groove 44 and the periphery of the member 45 will be out of engagement with the base or deepest portion of the groove 44.

Having thus fully described my invention, what I claim as new and desire to secure by Letters Patent, is:—

1. In a toy of the character described, the combination with a body portion, an axle mounted on said body portion, and ground wheels carried by said axle and having a plurality of frictional contact surfaces, of a shaft mounted on said body portion and having near each end thereof a plurality of frictional contact surfaces adapted to coöperate with the frictional contact surfaces of the respective ground wheels, the contact surfaces of both said shaft and said wheels being inclined to the plane of their rotation to afford a wedging effect, said axle and said shaft being relatively movable, and an inertia wheel carried by said shaft whose weight co-acts with the said frictional surfaces to hold them together with a wedging action.

2. In a toy of the character described, the combination, with a body portion, an axle movably mounted on said body portion, and ground wheels carried by said axle and having a plurality of frictional contact surfaces, of a shaft mounted on said body portion and having near each end thereof a plurality of frictional contact surfaces adapted to coöperate with the frictional contact surfaces of the respective ground wheels, the contact surfaces of both said shaft and said wheels being inclined to the plane of their rotation to afford a wedging effect, and an inertia wheel carried by said shaft, whose weight co-acts with the said frictional surfaces to hold them together with a wedging action.

In testimony whereof, I affix my signature in presence of two witnesses.

DAVID P. CLARK.

Witnesses:
 CARL F. SHULER,
 HENRY A. STOUT.